US005115874A

United States Patent [19]

Hayahara et al.

[11] Patent Number: 5,115,874

[45] Date of Patent: May 26, 1992

[54] APPARATUS FOR AUTOMATICALLY PREPARING A DYEING SOLUTION

[75] Inventors: Takuro Hayahara; Haruo Katahira, both of Osaka; Akiyoshi Nishida; Susumu Fukuda, both of Okayama, all of Japan

[73] Assignees: Japan Exlan Company, Limited; Excom Co., Ltd., both of Osaka, Japan

[21] Appl. No.: 588,098

[22] Filed: Sep. 21, 1990

[30] Foreign Application Priority Data

Oct. 3, 1989 [JP] Japan .................................. 1-259640

[51] Int. Cl.[5] .............................................. G01G 19/22

[52] U.S. Cl. ........................................ 177/70; 177/145

[58] Field of Search .................................. 177/70, 145

[56] References Cited

U.S. PATENT DOCUMENTS

| | | | |
|---|---|---|---|
| 2,374,430 | 4/1945 | Hexter | 177/70 |
| 2,848,019 | 8/1958 | Corbin et al. | 177/70 |
| 3,878,907 | 4/1975 | Morick | 177/70 |
| 4,323,097 | 4/1982 | Achen | 141/168 |
| 4,473,173 | 9/1984 | DeGroff et al. | 222/63 |
| 4,585,148 | 4/1986 | Ito | 222/77 |
| 4,691,850 | 9/1987 | Kirschmann et al. | 222/642 |
| 4,830,125 | 5/1989 | Aoki et al. | 177/70 |
| 4,830,508 | 5/1989 | Higuchi et al. | 366/152 |
| 4,871,262 | 10/1989 | Krauss et al. | 366/160 |

FOREIGN PATENT DOCUMENTS

| | | |
|---|---|---|
| 0176140 | 4/1986 | European Pat. Off. . |
| 889724 | 2/1962 | United Kingdom . |

*Primary Examiner*—George H. Miller, Jr.

*Attorney, Agent, or Firm*—Wenderoth, Lind & Ponack

[57] ABSTRACT

An apparatus for automatically preparing dyeing solutions, comprising for respectively accommodating dye stock solutions and dye auxiliary solutions; transfer means loaded with the containers; outflow pipes incorporated with a cleaning mechanism and also equipped with a pump and a valve for causing an outflow of the dye stock solutions and the dye auxiliary solutions from the containers; receiving vessels for successively receiving the dye stock solutions and the dye auxiliary solutions from the outflow pipes; weighing means for converting, into electric signals, weight changes of the dye stock solutions and the dye auxiliary solutions which have been received in the receiving vessels; transfer means loaded with the receiving vessels; a control mechanism for continuously or intermittently opening and closing the pump and the valve by making a comparison with a predetermined value in accordance with a level of the electric signal; a dilution water outflow pipe provided with a valve for causing dilution water to flow into the receiving vessels after completely weighing the dye stock solutions and the dye auxiliary solutions; and a control mechanism for continuously or intermittently opening and closing the valve of the dilution water outflow pipe in accordance with a predetermined value.

5 Claims, 1 Drawing Sheet

APPARATUS FOR AUTOMATICALLY PREPARING A DYEING SOLUTION

Figure 1:
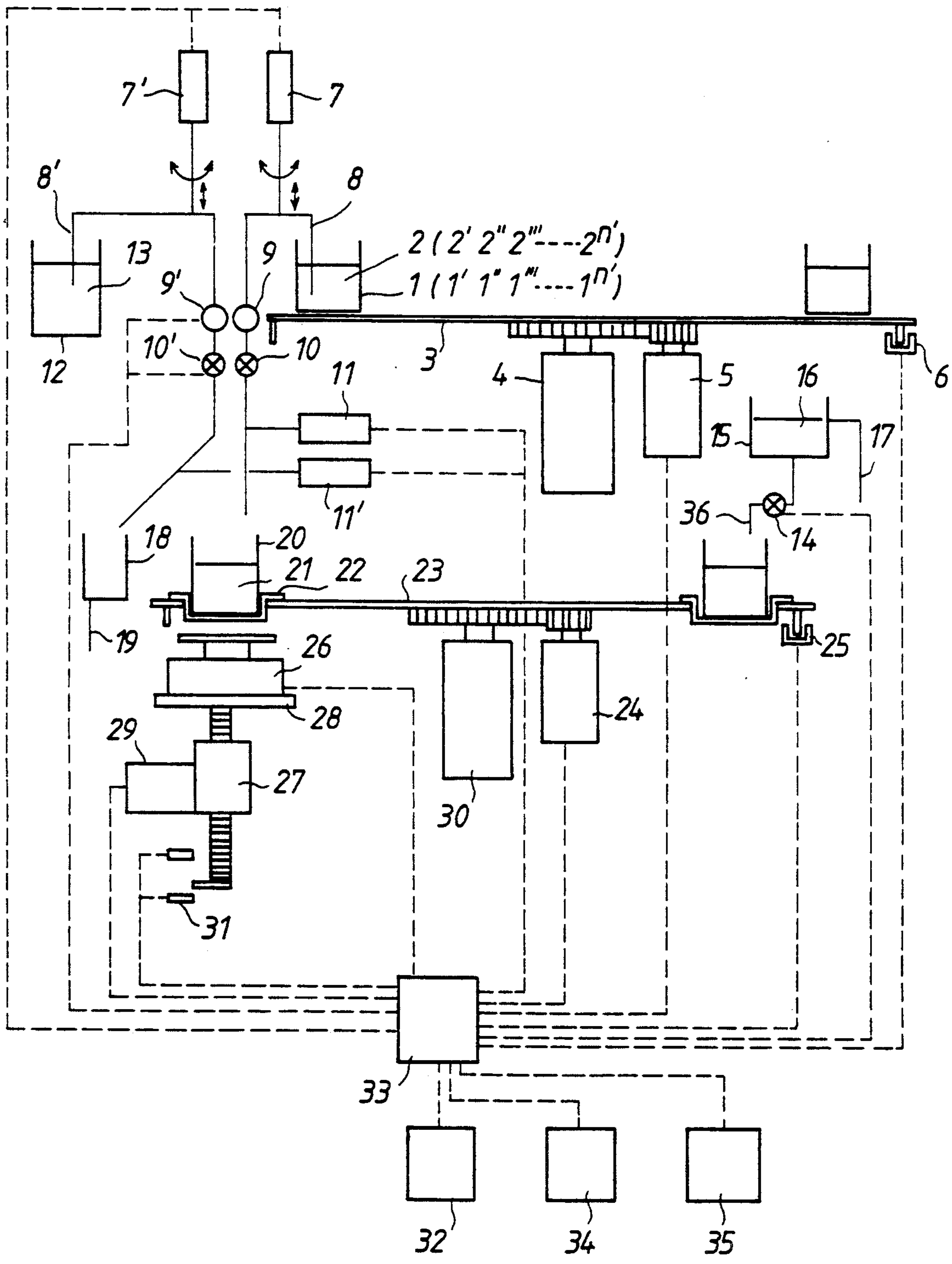

The present invention generally relates to an apparatus for automatically preparing a dyeing solution, and more particularly, to an apparatus effective in automatically sequentially preparing dyeing solutions exhibiting desired concentrations and color tones by automatically combining a plurality of dye stock solution, dye auxiliary solutions and a predetermined amount of water.

A prior art method of preparing dyeing solutions involves the steps of empirically selecting a plurality of dyes composing color components of a desired color sample; preparing the dyeing solutions; dyeing a fabric; comparing the dyed color with a sample color; and deciding the final recipe of the dyeing solutions by repeating the operation, more than several times in some cases. In recent years, a method referred to as a color matching method has been developed. This method is intended to effect measurement-based color matching by use of a spectrophotometer and a digital computer.

By the computer color matching method, the color samples are analyzed and can quickly be expressed with dye concentrations based on the three primary colors. An operation indispensable for color matching is, however, a selection of the three-primary-color-based dyes employed for such an expression among a multiplicity of commercially available dyes, considering quality, like the fastness of the fabric, and the profitability associated with costs thereof. Another indispensable operation is a visual detection to identify the dyed color with the color sample. In reality, the preparation of the dyeing solutions with the selected dyes relies on manual operations. This requires well-experienced and skillful operations and also a good deal of labor.

Under such circumstances, in recent years apparatuses for automatically preparing the dyeing solutions were disclosed in Japanese Patent Application Nos. 27515/1981 and 138566/1982. In those apparatuses, the dye stock solutions are volumetrically measured. This tends to cause errors due to mixing of air bubbles and volumetric variations concomitant with changes in temperature. Though such apparatuses contribute to a speed-up of operation and saving of labors, problems remain unsolved in terms of accuracy of measurement. The present applicant, in Japanese Patent Application No. 68117/1982, proposes an apparatus for automatically preparing the dyeing solutions at a high accuracy and efficiency, the apparatus making a measurement by the gravimetric method. Also proposed in Japanese Patent Application No. 17857/1985 are apparatuses for automatically preparing the dye solutions at a much higher efficiency. One apparatus is capable of sequentially consecutively performing such operations plural times as to set a receiving vessel like a coloring pot or a beaker in a fixed position and weigh and prepare the dyeing solutions. The other apparatus is capable of automatically preparing not only the dyeing solutions but also a variety of chemicals at a high accuracy and efficiency.

Highly accurate and efficient preparation was attainable with the apparatus for automatically preparing dyeing solution proposed in Japanese Patent Application Nos. 68117/1982 and 17857/1985. Nevertheless, the following problems arose. The apparatus is provided with containers for accommodating a multiplicity of dye stock solutions and dye auxiliary solutions. Hence, the apparatus increases in size, resulting in a difficulty of selecting a location for installation thereof. The dye stock solution always stays in an outflow pipe for causing an outflow of the dye stock solution. Even in a mere residence time of approximately 30 min., a disperse dye precipitates in the outflow pipe, thereby deteriorating the accuracy. Since a multiplicity of outflow pipes are provided, cleaning those pipes inconveniently requires much time.

Besides, a slurry such as a liquid dye was unusable.

It is an object of this invention, which obviates the problems inherent in the prior art apparatuses for automatically preparing dyeing solutions, to provide an apparatus for automatically preparing dyeing solutions at a much higher accuracy and efficiency, comprising: containers for respectively accommodating a plurality of dye stock solutions and dye auxiliary solutions; a transfer means loaded with the plurality of containers; a pump and a valve for causing an outflow of the dye stock solutions and the dye auxiliary solutions; a plurality of outflow pipes each incorporating a cleaning function; receiving vessels for successively receiving the dye stock solutions and the dye auxiliary solutions which flow out of the outflow pipes; a weighing means for converting, into electric signals, weight changes of the dye stock solutions and the dye auxiliary solutions which have been received in the receiving vessel; a transfer means loaded with the plurality of receiving vessels; a control mechanism for continuously or intermittently opening and closing the pump and the valve by making a comparison with a predetermined value in accordance with a level of the electric signal; an outflow pipe provided with a valve for causing dilution water to flow into the receiving vessels after completely weighing the dye stock solutions and the dye auxiliary solutions; and a control mechanism for continuously or intermittently opening and closing the valve in accordance with a predetermined value.

According to the apparatus of this invention, the outflow pipes for flowing out the dye stock solutions and the dye auxiliary solutions are invariably kept clean. A slurry, like a liquid dye, is usable therein. A highly accurate and efficient preparation can be attained.

The apparatus of this invention is remarkably small in size, thereby making it possible to easily select a location for installation thereof.

One embodiment of the apparatus of this invention will hereinafter be described in detail with reference to the accompanying drawings.

FIG. 1 schematically illustrates the apparatus of the present invention.

Provided are a plurality of stock solution vessels (1, 1', 1'', 1''', . . . 1$^n$') for accommodating previously prepared desired dye stock solutions (2, 2', 2'', 2''', . . . 2$^n$') and/or dye auxiliary solutions (2, 2', 2'', 2''', . . . 2$^n$'). A digital display means (34) specifies the stock solution vessels (1), (1'), (1''), . . . (1$^n$') in conformity with a dye preparation recipe inputted to an input means (32). These stock solution vessels are placed in predetermined positions specified by the digital display means (34) in accordance with the dye preparation recipe inputted to the input means (32). The dye stock solution is likely, as in the case of a disperse dye, to precipitate when being left to stand. Such a dye stock solution can be stirred by a magnetic stirrer.

The stock solution vessels (1, 1', 1'', 1''', . . . 1$^n$') accommodating the dye stock solutions (**2, 2', 2'', 2''', . . .

$2^{n}$) and/or dye auxiliary solutions (2, 2', 2'', 2''', . . . $2^{n'}$) set on a stock solution vessel table (3) are stopped in a supply position with a turn of the stock solution vessel table (3).

The stock solution vessel table (3) is formed with a plurality of recesses for placing the vessels (1) on the periphery of a circle which is concentric to the table (3). The table (3) is turned upon engaging a gear secured to a rotation shaft loosely inserted into a bearing (4) with a gear secured to a rotation shaft of a motor (5) with a braking means. The motor (5) operates in response to an electric signal transmitted from a control means (33). On the other hand, a plurality of detection ends for a plurality of position sensors (6) are provided on an outer periphery of the table (3). In response to the sensors (6), the detection ends transmit the electric signals to the control means (33). The operation of the motor (5) is thus controlled, and a command is given to stop the table (3) in a predetermined position.

An air cylinder (7) operates in response to the electric signal from the control means (33). A suck-up end of an outflow pipe (8) is thereby inserted into the vessel (1) disposed in a supply position on the table (3). Simultaneously, a forward end of the outflow pipe (8) is fixed upwardly of a purge pot (18) by operating the air cylinder (11). An electromagnetic valve (10) provided in the outflow pipe (8) is opened by the electric signal given from the control means (33). A pump (9) is energized to suck up the dye stock solution (2) of the vessel (1) into the outflow pipe (8). The dye stock solution (2) then flows into the purge pot (18) and the solution is ejected from wastepipe (19). The dye stock solution (2) is discharged for a given period of time by the electric signal from the control means (33) in order to replace other liquid inside the outflow pipe (8) with the dye stock solution (2). Thereafter, the electromagnetic valve (10) and the pump (9) are respectively closed and stopped. Concurrently, the forward end of the outflow pipe (8) is fixed upwardly of a receiver vessel (20) when the air cylinder (11) operates.

The pump (9) is actuated by the electric signal transmitted from the control means (33). The electromagnetic valve (10) opens and closes in response to the electric signals of the control means (33), whereby a desired amount of dye stock solution (2) is flowed out in conformity with the dye preparation recipe inputted to the input means (32).

The pump may be, for example, a roller pump or a gear pump.

As one mode of the opening/closing operation of the electromagnetic valve (10), 95% of a necessary amount of dye stock solution (2) is flowed out in a state where the electromagnetic valve (10) is opened. Subsequently, 100% of the necessary amount of solution (2), including the remaining 5%, is flowed out by repeating the instantaneous opening and closing operations of the electromagnetic valve (10)—i.e., by repeatedly effecting checks of dropping and weighing of the dye solution frequently.

Based on the method discussed above, the outflow pipe (8) is formed of, preferably, a fluorocarbon resin in terms of flexibility, anticorrosiveness, liquid drop separation and prevention of intra-pipe staining and of clogging. To make the liquid drops separate completely from the forward end of the outflow pipe, preferably only the forward end thereof is formed to have a small diameter.

A plurality of receiver vessels (20) are placed on a plurality of receiver dishes (22) on a turntable (23). The turntable (23) is shown as one example of a transfer means. The transfer means may include, e.g., a rotary conveyor on condition that the transfer means is loaded with the plurality of receiver vessels on its plane part and is capable of transferring the vessels.

The turntable is formed with a plurality of notched holes for placing the receiver dishes (22) on the periphery of a circle which is to the turntable concentric. Employed is, for instance, a receiving vessel including its body portion having an outside diameter which is smaller than that of the notched hole. Using the receiver dish (22), though not necessarily employed, desirably makes it possible to adequately utilize a dye pot, a beaker and the like as a receiving vessel. Preferably, the receiver dish (22) is so constructed that the outside diameter of its body portion is smaller than that of the notched hole of the turntable to assume a tapered configuration. The separation from the turntable is thereby facilitated. Besides, as will be mentioned later, the receiver dish is used together with the receiving vessel for measuring weight, and therefore is formed of, preferably, a synthetic resin rather than a metal because of its exhibiting a smaller density.

There is no problem if the turntable (23) is made of a metal plate or a synthetic resin plate. However, the more preferable material is synthetic resin in terms of load and therefore the power to drive the turntable, and also anticorrosiveness.

The turntable (23) is turned by engagement of a gear secured to a rotation shaft loosely inserted in a bearing (30), with a gear secured to a rotation shaft of a motor (24) with a braking means. The motor (24) operates in response to electric signals transmitted from the control means (33).

On the other hand, a plurality of detection ends for a plurality of position sensors (25) are provided on an outer periphery of the table (23). In response to the sensors (25), the detection ends transmit the electric signals to the control means (33). The operation of the motor (24) is thus controlled, and a command is given to stop the table (23) in a predetermined position.

Among the plurality of receiving vessels (20), the vessels (20) for performing the preparation are positioned downwardly of the outflow pipe (8). An electronic balance means (26) serving as a weighing means is disposed at a constant spacing downwardly of the receiving vessels. The electronic balance means (26) transmits, to the control means (33), an electric signal representing a weight value of the object to be weighed. A weighed result outputted concurrently with the weighing process can, if necessary, be confirmed on a digital display means (34) incorporated in the apparatus or recorded by a printer means (35).

The electronic balance means (26) is, when measuring a weight of the chemical flowing into the receiving vessel (20) or the container, lifted by rack-pinion mechanism (27) serving as a lifting-lowering means which will be stated later. The receiving vessel is placed on the electronic balance means to measure the weight and make the preparation. After finishing these operations, the electronic balance means (26) is lowered down to its original position. In the apparatus of this invention, as described above, the electronic balance means serving as the weighing means is moved to measure the weight without moving the object to be measured. Hence, the structure of the invention is simpler than, e.g., a system for moving up and down a transfer means mounted with the plurality of containers while fixing the balance means, or a system for mechanically moving the receiving vessel onto a balance base. The apparatus of this invention does not cause, leakage of liquid due to vibrations of the object to be weighed and enables a speed-up of weighing. The weighing system of this invention is therefore efficient.

The following is a detailed description of the rack-pinion mechanism serving as the lifting-lowering means for the electronic balance means (26). The electronic balance means (26) is fixed to a frame (28) moved up and down by the rack-pinion mechanism (27). In this embodiment, the rack-pinion mechanism has been exemplified as a lifting-lowering means, but any kind of mechanism may be adopted on condition that they are capable of vertically moving the electronic balance means at a predetermined distance. As a matter of course, for instance, a hydraulic mechanism, a pneumetic mechanism or a screw mechanism are similarly adoptable.

The rack-pinion mechanism (27) is combined with a motor (29) with a braking means to thereby rotate a pinion by the electric signals from the control means (33). A pinion meshes with a rack having its upper end fixed to the frame (28). The rack moves up and down when the pinion rotates. A detection end of a distance sensor (31) is provided at a lower end of the rack to control an up-and-down moving distance of the electronic balance means (26). In response to the distance sensor (31), the electric signals are transmitted to the control means (33).

One example of the preparing operation by the thus constructed apparatus of this invention will be explained in greater detail.

Above the electronic balance means (26), the receiver dish (22) and the receiving vessel (20) are placed on the turntable (23) at a predetermined spacing from the electronic balance means. The dish (22) and the vessel (20) are then put on the base of the electronic balance means (26) lifted by the rack-pinion mechanism (27) so as to be released from the turntable (23). A weight (a tare) is measured. Subsequently, in accordance with a first dye preparation recipe inputted to the input means (32), the electromagnetic valve (10) is opened and closed so that the solution of a specified weight drops down into the receiving vessel (20). The first weighing operation is thus completed. Thereafter, the electronic balance means (26) is lowered. The receiver dish (22) and the receiving vessel (20) are placed on the turntable (23) and separated from the electronic balance means (26).

On the other hand, for weighing in accordance with a second dye preparation recipe inputted to the input means (32), the table (23) is turned so that the specified vessel (20) is positioned above the electronic balance means (26) (under the outflow pipe (8)). Then the table (23) stops in a specified position. Based on the dye preparation recipe inputted to the input means (32), the electromagnetic valve (10) is opened and closed by the electric signals of the control means (33). A desired amount of dye stock solution (2) is thereby flowed out. The second weighing operation is thus finished.

The third, fourth, . . . n-th weighing operations of the dye stock solution (2) will thereinafter be finished in the same way according to the dye preparation recipe inputted beforehand to the input means (32). The pump (9) stops operating in response to the electric signals given from the control means (33).

Subsequent to the above described step, the cleaning mechanism functions as follows. On the basis of the dye preparation recipe initially inputted beforehand to the input means (32), a suck-up part of the outflow pipe (8, . . .) filled with the dye stock solution (2) is raised by operating the air cylinder (7) in response to the electric signals coming from the control means (33). Subsequently, the suck-up part thereof rotates (see FIG. 1) to a position upwardly of a cleaning tank (12), and an outflow pipe (8′, . . .) cleaned by cleaning water is raised by operating an air cylinder (7′) in response to electric signals coming from the control means (33). Then the outflow pipe (8′) rotates (see FIG. 1) to a position above a supply position on the stock solution vessel table (3) by operating air cylinder (7′).

The forward end of the pipe (8) is fixed upwardly of the purge pot (18) when an air cylinder (11) is operated by the electric signals from the control means. The suck-up part of the pipe (8) is then immersed in cleaning water (13) by operating the air cylinder (7). Then the pump (9) starts. The electromagnetic valve (10) is thereby opened to effect cleaning of the pipe (8) for a predetermined period of time. Simultaneously when finishing the cleaning operation, the pump (9) stops. The suck-up part of the pipe (8) emerges out of the cleaning water (13) by operating the air cylinder (7). The cleaning water (13) staying in the outflow pipe (8) is discharged into the purge pot (18). After this, the electromagnetic valve (10) is closed. By these operations, cleaning of the outflow pipe (8) is accomplished and the outflow pipe (8′) can be used to introduce another dye stock solution into the receiving vessel (20).

In the meantime, the stock solution vessel (1′) disposed on the table (3) stops in the supply position with a turn of the table (3) in response to the electric signals from the control means. The vessel (1′) accommodates the solution to be mixed with the dye stock solution (2) which has previously been weighed. The dye stock solution (2′) of the vessel (1′) flows similarly via the outflow pipe (8′), pump (9′), electromagnetic valve (10′) and air cylinder (11′), and the desired amount of the dye stock solution (2′) is weighed.

The plurality of dyeing solutions will hereinafter be prepared in conformity with the dye preparation recipe previously inputted to the input means (32) in the same manner.

Dilution water is added to a prepared solution (21) within the receiving vessel (20) set in a fixed position on the turntable (23). The dilution water flows via an outflow pipe (36) into the vessel (20). The pipe (36) is provided with an electromagnetic valve (14). The valve (14) is opened and closed by the electric signals coming from the control means in conformity with the dye preparation recipe inputted to the input means (32). A desired amount of dilutionw water (16) flows therefrom, thus finishing the first preparation. Next, for adding the dilution water on the basis of the second dye preparation recipe previously inputted to the input means (32), the turntable (23) is turned so that the specified receiving vessel (20) is positioned under the pipe (36). The table (23) stops in a specified position. The electromagnetic valve (14) is opened and closed by the electric signals from the control means (33) in conformity with the dye preparation recipe inputted to the input means (32) with the intention of flowing out a desired amount of dilution water (16). The second weighing operation is thus completed.

The third, fourth, . . . n-th additions of the dilution water (16) are similarly finished in accordance with the dye preparation recipe inputted beforehand to the input means (32).

The desired amount of dilution water (16) is controlled depending on the time of outflow. Hence, the level of water is kept constant by continuously flowing the water into an overflow pipe (17) in view of the necessity for keeping the outflow quantity per unit time at a constant value.

As discussed above, in the apparatus of this invention, the outflow pipe for causing an outflow of the dye stock solutions and dye auxiliary solutions is always kept clean. The apparatus of this invention is also able to handle highly viscous dye solutions and dye dispersions, such as a paste or slurry. A highly accurate and efficient preparation is attainable. The apparatus of this invention is remarkably small in size, to thereby facilitate selection of a location for its installation.

What we claim is:

1. An apparatus for automatically preparing dyeing solutions, comprising: a plurality of containers for respectively accommodating a plurality of dye stock solutions and dye auxiliary solutions; a transfer means loaded with said plurality of containers; a plurality of outflow pipes incorporated with a cleaning mechanism and also equipped with a pump and a valve for causing an outflow of said dye stock solutions and said dye auxiliary solutions from respective said containers; a plurality of receiving vessels for successively receiving said dye stock solutions and said dye auxiliary solutions from said outflow pipes; a weighing means for converting, into electric signals, weight changes of said dye stock solutions and said dye auxiliary solutions which have been received in said receiving vessels; a transfer means loaded with said plurality of receiving vessels; a control mechanism for continuously or intermittently opening and closing said pump and said valve by making a comparison with a predetermined value in accordance with a level of said electric signal; a dilution water outflow pipe provided with a valve for causing dilution water to flow into said receiving vessels after completely weighing said dye stock solutions and said dye auxiliary solutions; and a control mechanism for continuously or intermittently opening and closing said valve of said dilution water outflow pipe in accordance with a predetermined value.

2. The apparatus as set forth in claim 1, wherein said pump is a roller pump.

3. The apparatus as set forth in claim 1, wherein said pump is a gear pump.

4. The apparatus as set forth in claim 1, wherein said weighing means is an electronic balance.

5. The apparatus as set forth in claim 1, wherein said transfer means is a turntable or a rotary conveyor.

* * * * *